United States Patent [19]
Andreasen

[11] Patent Number: 4,462,266
[45] Date of Patent: Jul. 31, 1984

[54] KILN FLOOR SYSTEM

[76] Inventor: Norman H. Andreasen, 1520 Norwood Ave., Itasca, Ill. 60143

[21] Appl. No.: 445,919

[22] Filed: Dec. 1, 1982

Related U.S. Application Data
[62] Division of Ser. No. 235,656, Feb. 18, 1981.

[51] Int. Cl.³ .................. F16H 21/44; G05G 1/04
[52] U.S. Cl. ............................................. 74/97; 74/520
[58] Field of Search ............. 74/38, 105, 106, 97, 74/520

[56] References Cited

U.S. PATENT DOCUMENTS

| | | | |
|---|---|---|---|
| 2,426 | 12/1866 | Steadman | 74/105 |
| 226,890 | 4/1880 | Toepfer | 34/237 |
| 581,137 | 4/1897 | Prinz | 34/237 |
| 698,344 | 4/1902 | Warner | 74/422 |
| 747,143 | 12/1903 | Colby | 34/237 |
| 850,214 | 4/1907 | Dornfeld | 34/237 |
| 2,738,034 | 3/1956 | Levine | 74/520 |
| 2,943,498 | 7/1960 | Smith | 74/520 |

Primary Examiner—Lawrence J. Staab
Assistant Examiner—Michael J. Gonet
Attorney, Agent, or Firm—Edward D. Gilhooly

[57] ABSTRACT

A kiln floor system having a plurality of sequentially operated, pivotally mounted trays capable of dumping a load of grain in a minimum of time. Typical field trays of the floor are coupled in pairs to a single air cylinder for economy of operation. The gear rack associated with the turning machine is independently adjustable to insure alignment of the gear rack. The floor includes stringer gage members to insure proper installation and alignment of the stringers. A wall panel is provided for updated restoration and automation of existing kiln floors.

1 Claim, 36 Drawing Figures

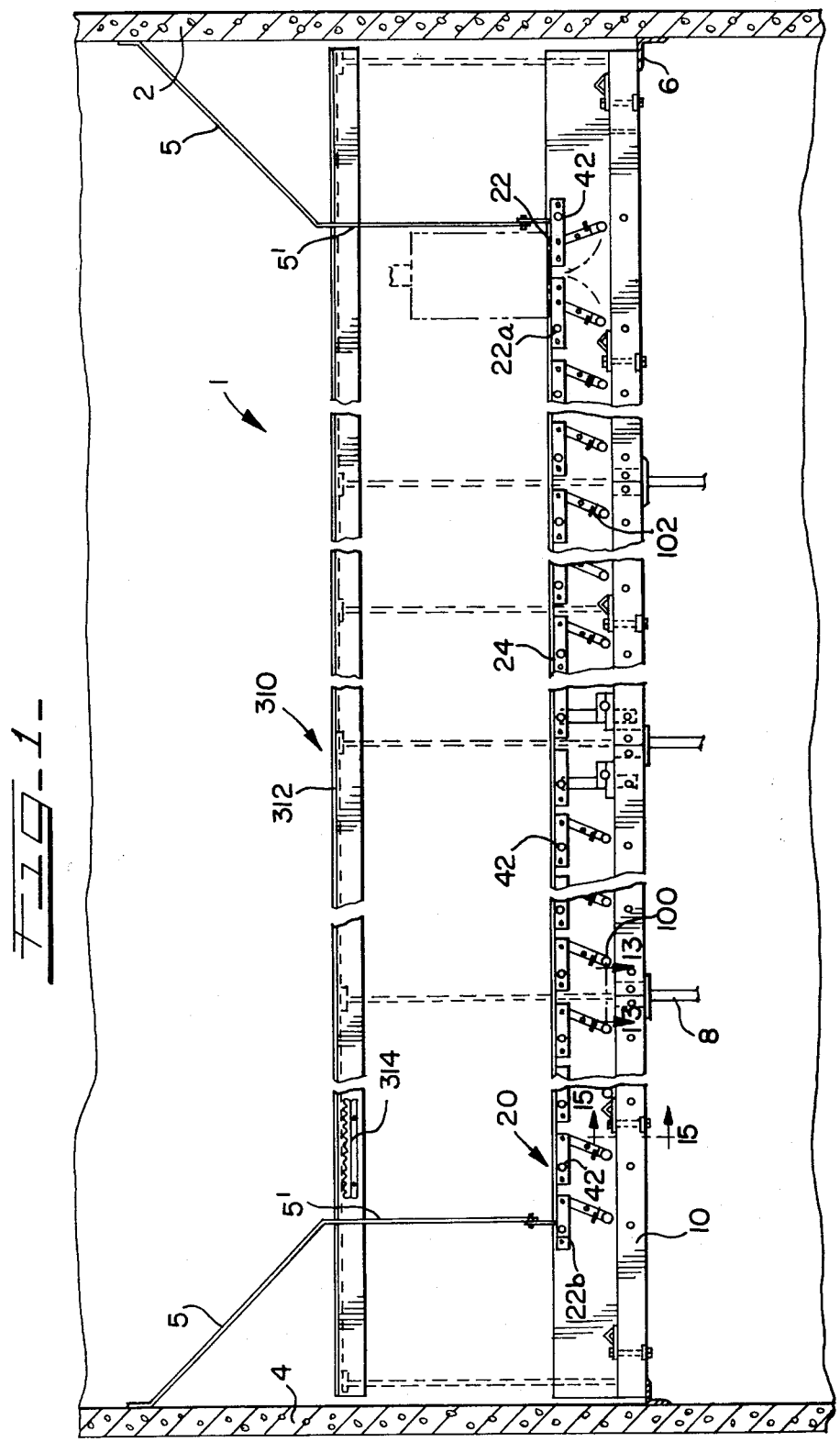

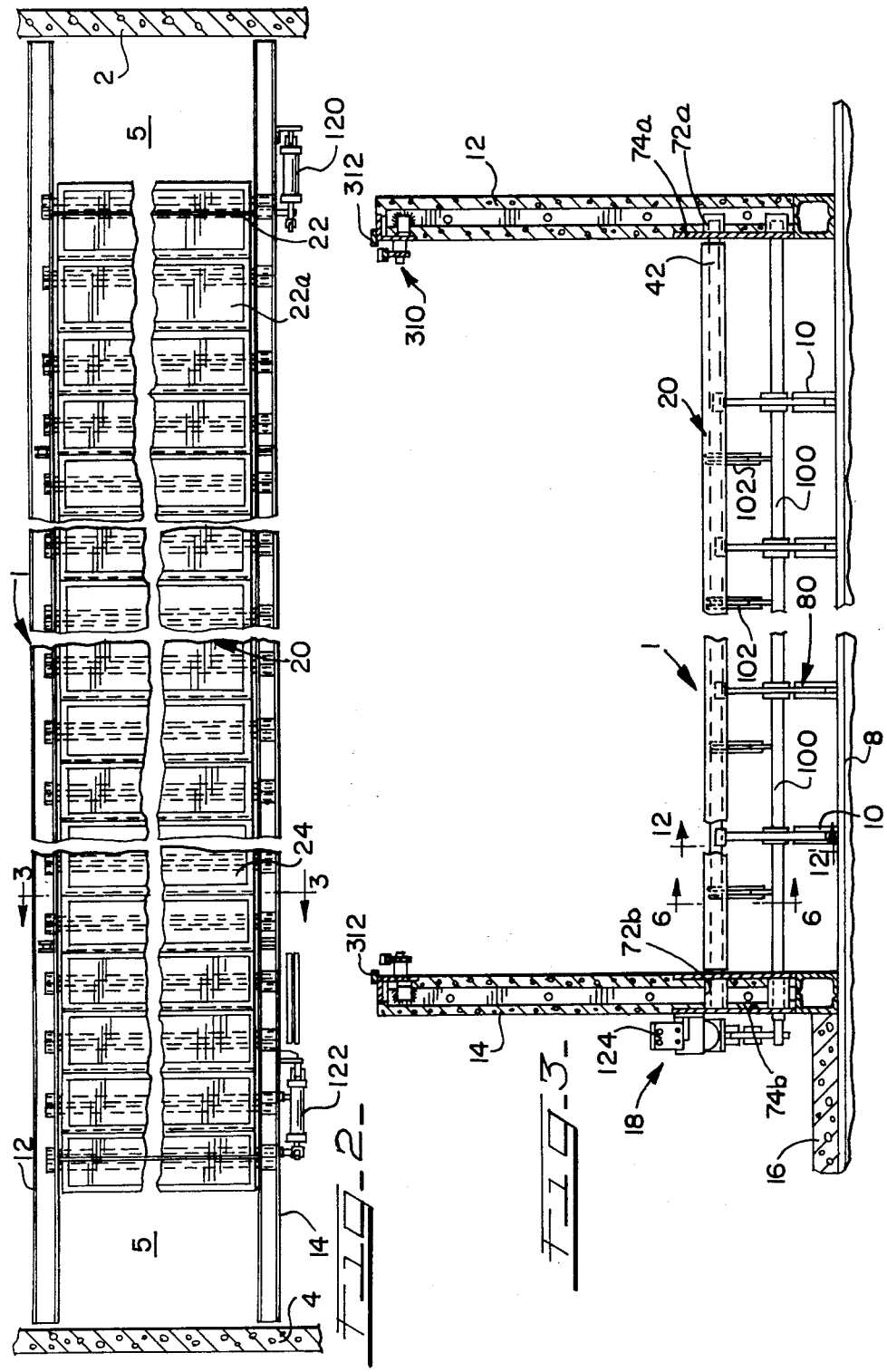

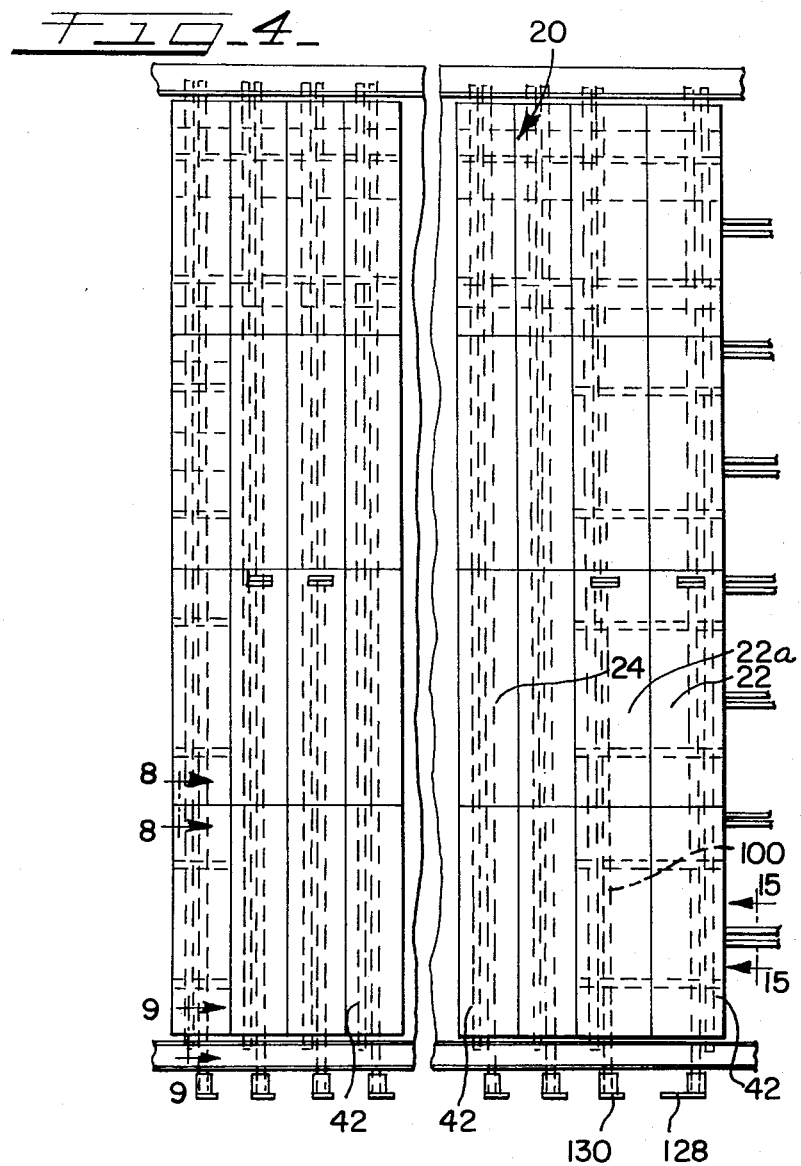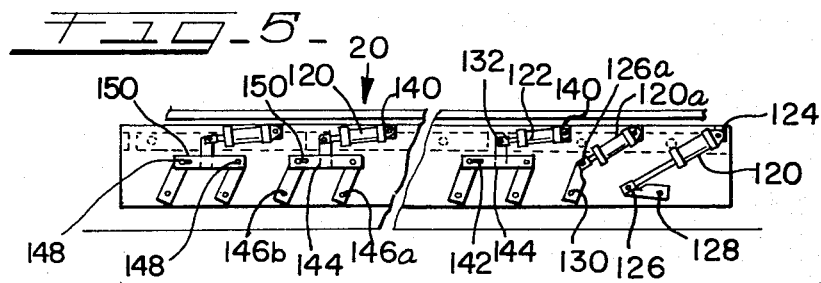

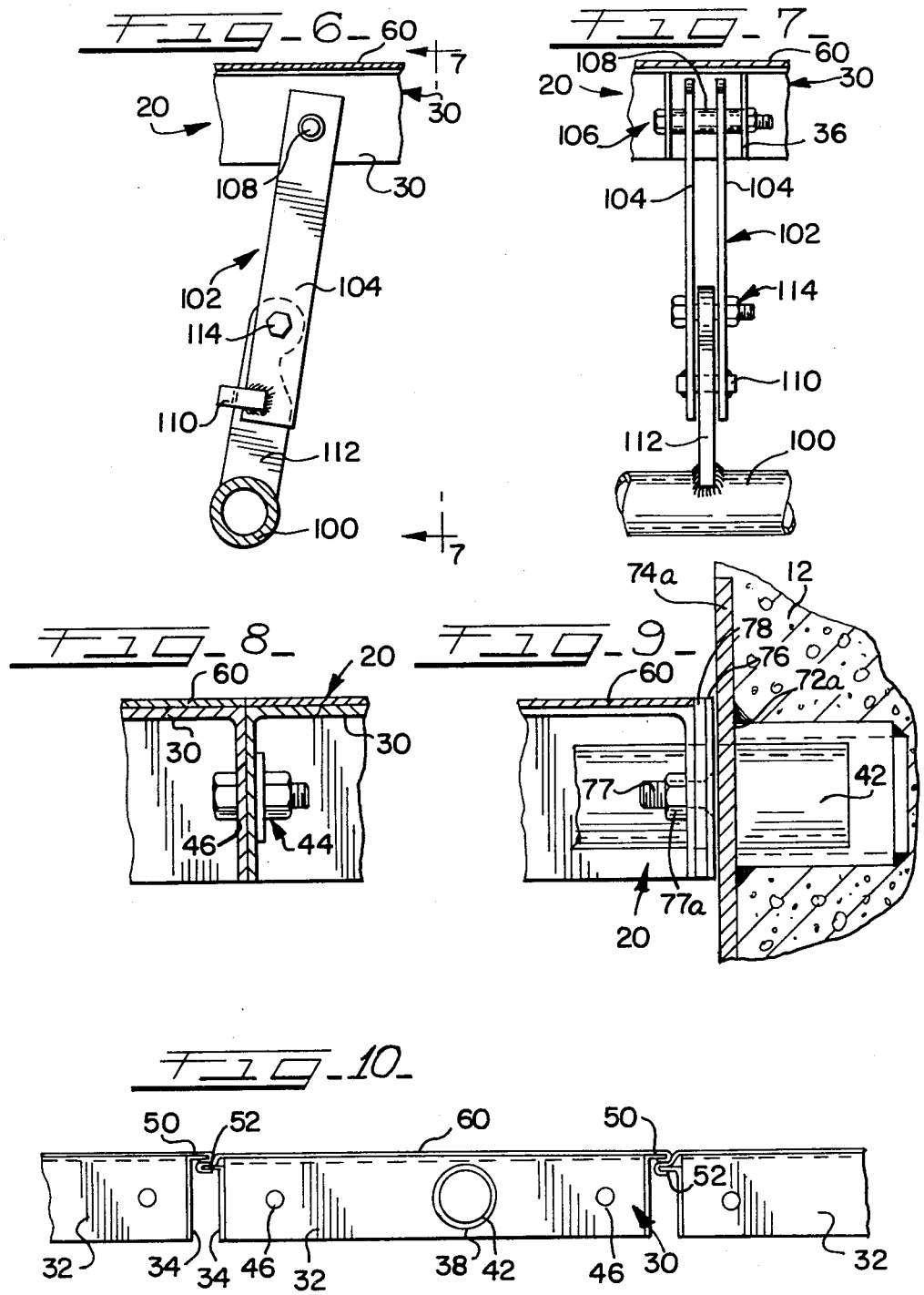

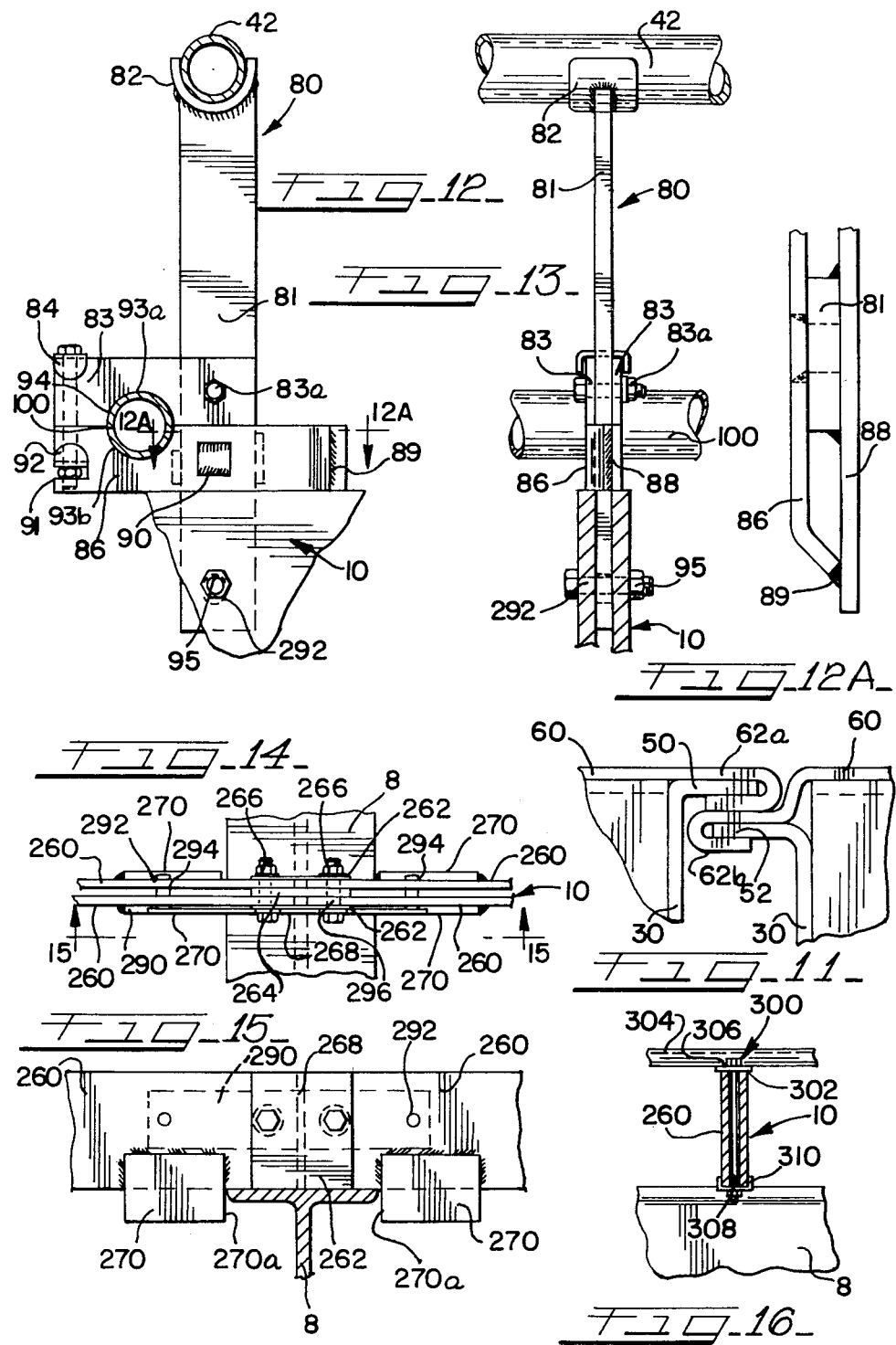

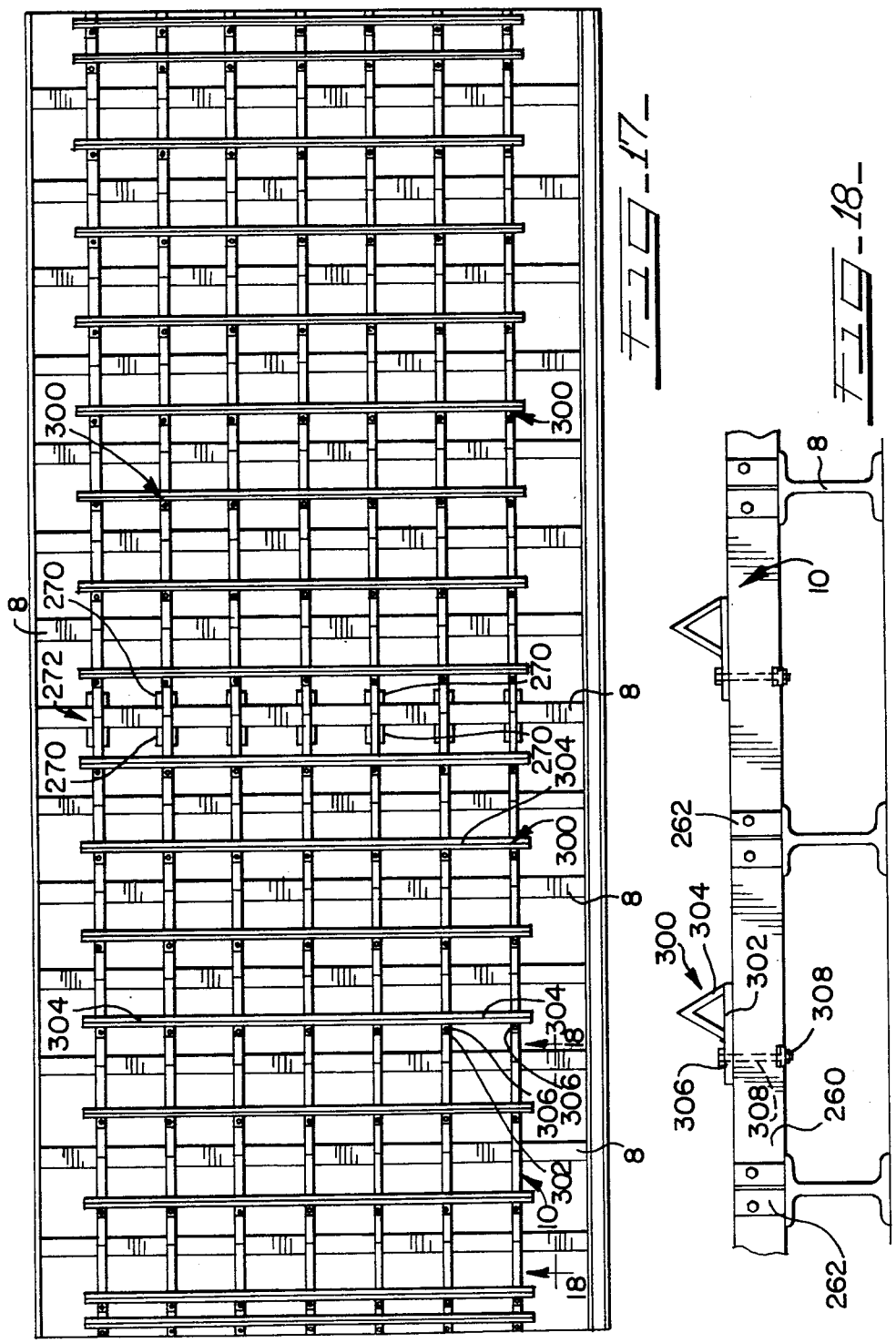

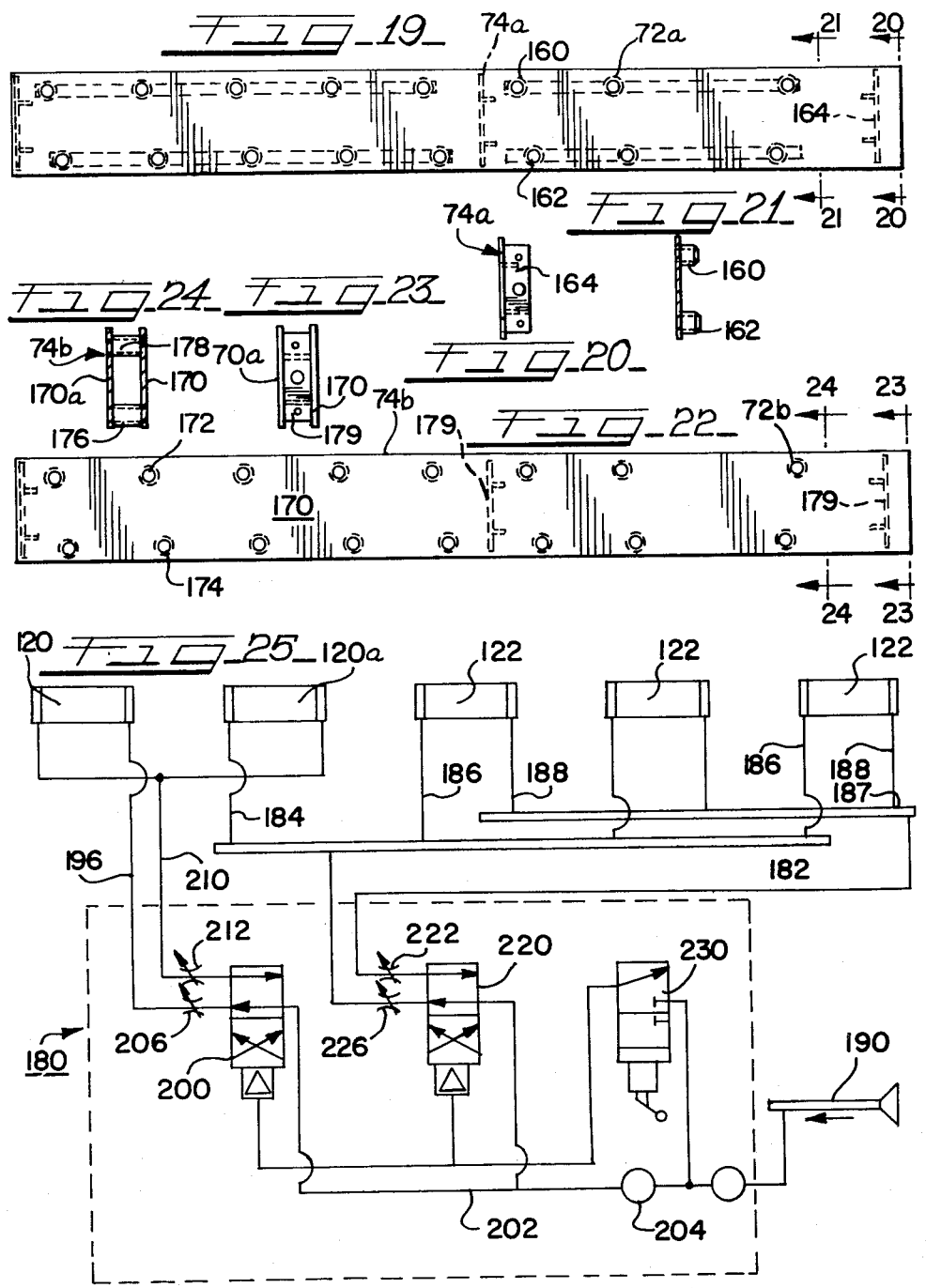

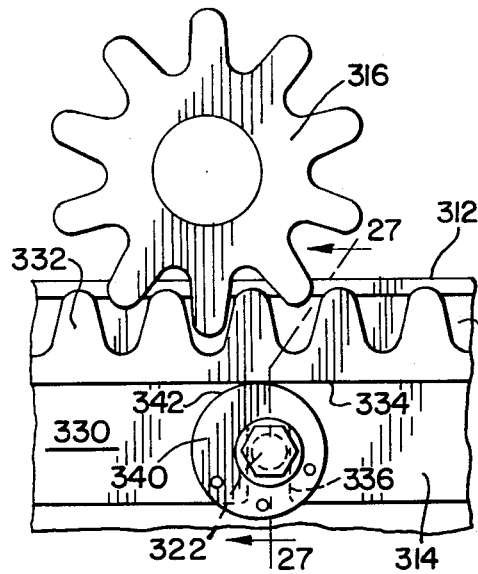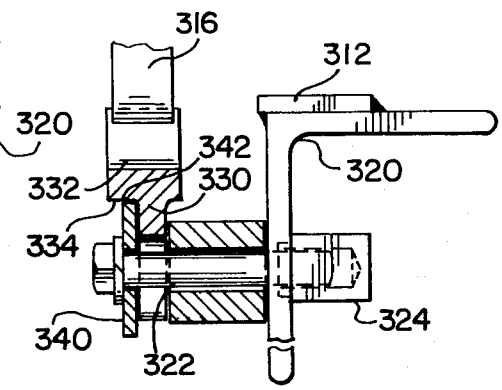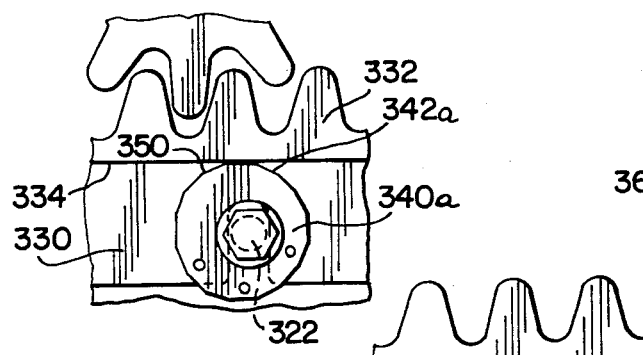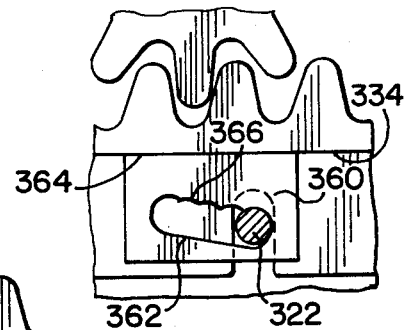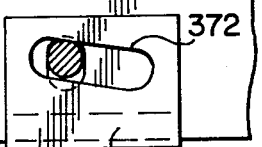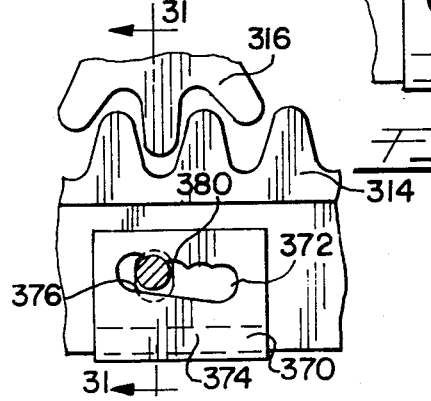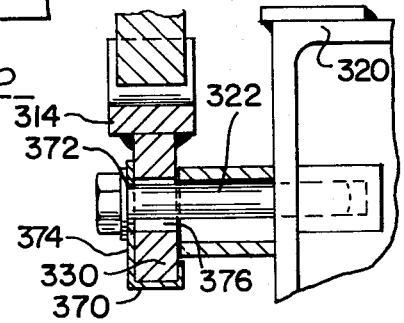

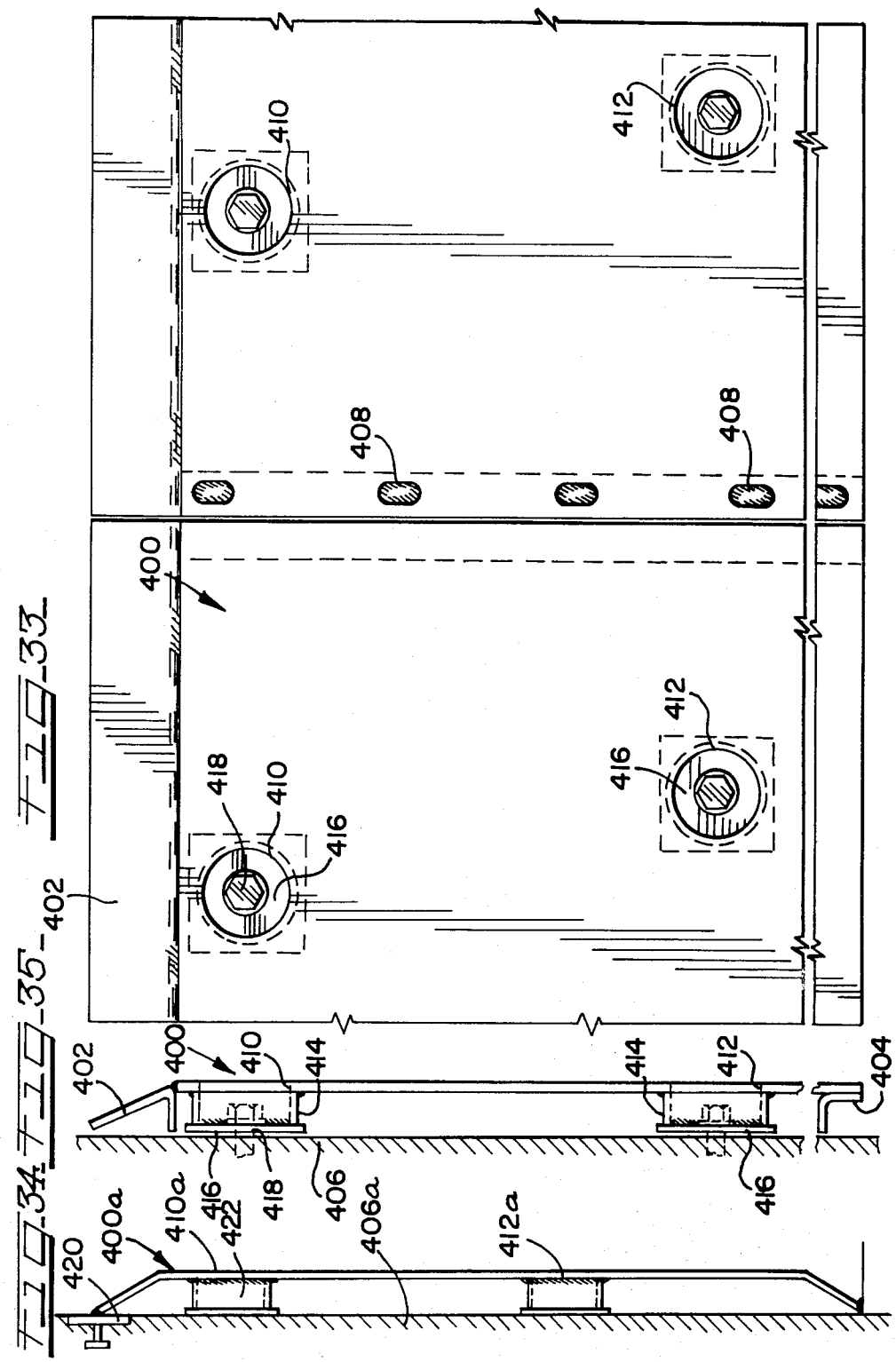

KILN FLOOR SYSTEM

This is a division of application Ser. No. 235,656, filed Feb. 18, 1981.

BACKGROUND OF THE INVENTION

This invention relates in general to kilns and, in particular, to a kiln floor system adapted to dump a load of grain supported thereon.

More specifically, but without restriction to the particular use which is shown and described, this invention relates to a fully automated malt house kiln floor which allows a loaded floor to be dumped efficiently and in a minimum of time. The kiln floor system herein disclosed is capable of being readily installed in existing kilns and is designed for sustained, trouble free operation.

It has long been a practice to dry grain within a kiln and subsequently dump the loaded floor for subsequent use of the material in the brewing process. The malt being processed within the malt house typically may pile two or three feet high over a kiln floor at a density of approximately 80 to 120 pounds per square foot. Because of the large quantity of material being dried on the kiln, the floor has conventionally comprised a number of pivotal panel sections that allow the grain to dump in a sequential basis and minimize the forces required in the discharge process. Such floor sections have in the past been manually operated by a crew who progress down the length of the floor and physically rotate each section until the floor is totally dumped. Not only is such manual operation of a kiln floor an arduous and unpleasant task because of the work exerted and unhealthy surrounding conditions, a manually operated kiln floor requires a relatively long period of labor to complete the dumping sequence.

In recent years, several automated kiln floors have been introduced into the industry to overcome the inherent problems associated with manual operation, even though large numbers of manually operated kiln floors still exist at the present time. An example of an automated malt house kiln floor is disclosed in the Ricklick Patent, U.S. Pat. No. 3,243,894 issued Apr. 5, 1966. Such automated floors known in the prior art suffer from numerous disadvantages to the extent that optimum performance and reliability have not been attained. For example, prior automated kiln floors have reduced the length of time required to dump the grain from the floor as compared to manual operation, but these systems still require a relatively long period of time to discharge the grain completely from the floor. The inefficiency of these automated systems, such as disclosed in the Ricklick patent, occurs because of the use of cumbersome and ill-designed mechanisms to accomplish the pivotal action of each floor segment in a sequential manner. Because of such deficiencies, the automated systems previously employed in the industry have required the uneconomical use of force applying devices capable of exerting large forces to accomplish unloading of the kiln floor.

The present automated kiln floors are also incapable of being readily installed within the malt house with accuracy and once installed, to operate with a minimum of maintenance. Other problems are associated with known automated floors in use in malt houses. The grain supported on a kiln floor is generally subjected to a mixing action by a turning machine which moves slowly along the length of the floor while the drying process is being performed. A turning machine is normally provided with two or more flanged wheels that operate on a wear bar, and a driving pinion meshes with gear racks to propel the turning machine relative to the floor. However, after operation of the turning machine over a period of time, the gear rack and pinion are subject to wear and misalignment. As a result, the turning machine often falls onto the kiln floor and causes damage to both the grain and the floor itself, which results in extensive down time and repair. Past systems do not provide adjustment of the gear rack on a periodical basis to insure proper alignment of the pinion and gear rack, and prevent the turning machine from jumping the rack and falling against the floor.

Known automated kiln floors suffer from other shortcomings which interfere with effective operation and maintenance. Normally, the pivotal floor sections are covered by sheets or trays of metal attached to the frame structure of the floor. Conventionally, such trays include a leading and trailing portion that interconnect with an adjacent sheet to prevent the leakage of grain between the adjoining sections. In prior art devices, the edge portions of the sheet are a single layer of material and are attached to the framing members by means of rivets, screws or other attachment techniques. Fasteners in the form of rivets and the like are subject to popping loose under sustained use of the floor. Loose rivets and screws can fall into the grain and subsequently damage other machinery used in the brewing process. Such a problem in the food industry has required the government agencies to require fasteners to be magnetic so they can be detected and removed. In replacing a tray sheet, all fasteners must also be removed in order to repair and replace the trays. The necessity to remove each fastener during replacement of the sheets greatly complicates such expensive repair efforts.

In addition to the foregoing problems which have been recognized in the industry, the existence of a large number of manually operated kiln floors in use or, in some cases, inefficient automated systems, make it desirable that such floors be replaced at a minimum of cost and installation time with highly effective systems, such as provided by the invention of the application. This is particularly true at the present time due to energy considerations and government regulations.

Up to the advent of OSHA, EPA and FDA into the malting process and Brewery Industry, and the accelerated cost of fuel which is used to dry the barley malt, the maltsters did not recycle the spent hot kiln air but rather exhausted it out into the atmosphere. The above factors have required the maltsters to recycle the warm spent kiln air through heat exchangers so as to preheat incoming cold air and subsequently blend fresh heated air with recycled warm air. The spent kiln air during the tray dumping cycle is heavily laden with malt dust and is very injurious to the health of workers required to be in the dusty atmosphere. The exhaust fans are required to operate during the dumping cycle thereby forcing the dust laden air through the heat exchangers reducing their efficiency and requiring frequent cleaning. An alternate practice by some malsters is to by-pass the heat exchangers during the dumping cycle and exhaust the warm dust laden air directly out into the atmosphere. With the introduction of the fully automatic dumping kiln floor with remotely located controls as covered by the invention, the fans can be turned off or air flow greatly reduced as no personnel are required in the dusty atmosphere, such that the dust is not thrown into the heat exchangers, or into general plant area, or into the atmosphere, thereby improving health conditions, and reducing cleanup and fuel costs. In addition to the above advantages, the high efficiency of operation due to the present invention enables a complete floor to be dumped in eight minutes and fully reset in two minutes reducing the time and exposure cycle more than three or four times required by prior methods, including the system disclosed in the Ricklick patent, U.S. Pat. No. 3,242,894.

In the past, the installation of a fully automated system to replace an old manual arrangement requires significant structural alteration of the existing malt house, and the use of expensive components and labor to make the conversion. Known conversion techniques to update the equipment within a malt house have heretofore not provided suitable means by which such changes can be made efficiently and economically without, in effect, rebuilding the walls of the structure in order to support the components of the newly installed floor.

SUMMARY OF THE INVENTION

It is, therefore, an object of this invention to improve effectiveness and efficiency of operation of a kiln floor system.

Another object of this invention is to reduce the force required to unload a kiln floor system.

A further object of this invention is to improve the linkage between a kiln floor section and the force applying device for unloading a kiln floor.

Still another object of this invention is to delay the application of a force to an adjoining tray section in order to minimize the application of force to a kiln floor system during unloading.

A still further object of this invention is to reduce installation time and labor in installing a kiln floor system and to reduce maintenance cost and down time.

Still another object of this invention is to provide a kiln floor system which is accurately alignable into operable position during installation.

A still further object of this invention is to improve the trays which are used in conjunction with a kiln floor system.

Another object of this invention is to improve the securement of the trays to a kiln floor system.

Still another object of this invention is to permit periodic adjustment of the alignment of a gear rack associated with the turning machine in a kiln floor system.

Still another object of this invention is to conserve energy and reduce pollution of the atmosphere.

A still further object of this invention is to improve the attachment and securement of a kiln floor to an existing malt house structure.

Still another object of this invention is to permit existing malt houses to be modified to support and receive updated and improved kiln floor systems.

These and other objects are attained in accordance with the present invention wherein there is provided an improved kiln floor system having a plurality of sequentially operated tray sections which require a minimum amount of force application to accomplish dumping of grain being supported thereon. The invention of the application includes an improved linkage system by which a single force applying air cylinder and the like may be utilized to sequentially dump two or more floor sections. Such economy of operation is accomplished by an improved delay means to permit a single air cylinder or other force applying device to handle more than one pivotally mounted tray.

The invention of the application is further provided with means to allow its accurate installation in existing or in new construction for kiln houses, and the system includes means to insure that the kiln floor system operates as intended with a minimum of break down and maintenance. The plurality of trays supported on the kiln floor frame are provided with edge means which cooperate with adjoining trays in a manner to prevent leakage while the floor is loaded. The double thickness construction provided by the edge of the trays of the invention increases the strength of the edge portions and eliminates the need for rivets or screws as a securement technique. Thus, the tray sheets may be readily removed to permit new tray sheets to be installed on the system, if accidently damaged or necessary, after long use of the apparatus.

The gear rack of the kiln floor system herein disclosed includes adjustment means, such that alignment of the gear rack and the pinion of the turning machine may be maintained. Because of such a capability to adjust the position of the gear rack in accordance with the teachings of the invention, derailment of the turning machine as normally encountered in the prior art is significantly alleviated. Accordingly, the kiln floor assembly of the invention provides an improved and effective apparatus significantly reducing the time required for dumping a fully loaded kiln floor in a wholly automated fashion. The system of the invention further improves alignment and installation procedures and is capable of an extended lifetime of trouble-free operation.

BRIEF DESCRIPTION OF THE DRAWINGS

Further objects of the invention, together with additional features contributing thereto and advantages accruing therefrom will be apparent from the following description of preferred embodiments of the invention which are shown in the accompanying drawings with like reference numerals indicating corresponding parts throughout, wherein:

FIG. 1 is a side schematic view, with parts in section, of an embodiment of the kiln floor system of the invention installed in operative position within the confines of a barley malt house;

FIG. 2 is a top schematic view of the kiln floor system of FIG. 1;

FIG. 3 is an end schematic view of the kiln floor system of the invention taken along lines 3—3 of FIG. 2;

FIG. 4 is an enlarged partial top schematic view of the kiln floor system of FIG. 2;

FIG. 5 is an enlarged partial side view of the air cylinder system and drive linkage assembly of the kiln floor system of FIG. 1;

FIG. 6 is an enlarged partial schematic view, with parts in section, of a dump linkage bar of the kiln floor assembly of FIG. 1 taken along lines 6—6 of FIG. 3;

FIG. 7 is an end schematic view of the dump linkage bar taken along lines 7—7 of FIG. 6;

FIG. 8 is an end sectional view of the end by end attachment of adjacent tray members of the kiln floor assembly of the invention taken along lines 8—8 of FIG. 4;

FIG. 9 is an enlarged partial end sectional view of the tray assembly spacer and wall mounting taken along lines 9—9 of FIG. 4;

FIG. 10 is a partial end view of three tray assemblies in a closed position used in connection with the kiln floor system of FIG. 1;

FIG. 11 is an enlarged schematic end view of the coupling of adjacent rows of tray assemblies of FIG. 10 in a closed configuration;

FIG. 12 is an end schematic view of a support saddle of the kiln floor assembly of the invention taken along lines 12—12 of FIG. 3;

FIG. 12a is a sectional view taken along lines 12a—12a of FIG. 12;

FIG. 13 is an end schematic view of the support saddle of FIG. 12;

FIG. 14 is a partial top schematic view of the securement of stringer segments of the kiln floor assembly of FIG. 1;

FIG. 15 is a side schematic view of the stringer securement means taken along lines 15—15 of FIG. 14;

FIG. 16 is an end partial sectional view of the stringer locating brace of the kiln floor system of FIG. 1;

FIG. 17 is a top schematic view of the support structure, including stringers, I-beams and locating braces, of the kiln floor system of FIG. 1;

FIG. 18 is a partial end schematic view taken along lines 18—18 of FIG. 17;

FIG. 19 is a side schematic view of an embedment wall plate used in conjunction with one of the embedment walls of the kiln floor assembly of FIG. 3;

FIG. 20 is an end view of the embedment wall plate taken along lines 20—20 of FIG. 19;

FIG. 21 is an end sectional view of the embedment wall plate taken along line 21—21 of FIG. 19;

FIG. 22 is a side schematic view of an embedment wall plate for use with the opposite embedment wall as shown in the floor system of the invention of FIG. 3;

FIG. 23 is an end view of the embedment wall plate of FIG. 22 taken along lines 23—23 thereof;

FIG. 24 is a sectional end view of the embedment wall plate of FIG. 22 taken along lines 24—24 thereof;

FIG. 25 is a schematic diagram of the pneumatic air system of the kiln floor system of FIG. 1;

FIG. 26 is an enlarged side schematic view of a first embodiment of the gear rack adjustment means for use with the kiln floor system of the invention as shown in FIG. 1;

FIG. 27 is a sectional illustration of the pinion and gear rack of FIG. 26 taken along lines 27—27 thereof;

FIG. 28 is a partial side schematic view of an additional embodiment of the gear rack adjustment means for use with the kiln floor system of the invention;

FIG. 29 is still another embodiment of the gear rack adjustment means for use with the kiln floor system of the invention;

FIG. 30 is still another embodiment of the gear rack adjustment means of the invention for use with the kiln floor system such as shown in FIG. 1;

FIG. 31 is an end sectional view taken along lines 31—31 of FIG. 30;

FIG. 32 is a side schematic view of still another embodiment of the gear rack adjustment means of the invention for use with the kiln floor system of FIG. 1;

FIG. 33 is a side schematic view of another embodiment of the invention for wall panels for kiln floor restoration and automation for use with center operated kiln floor systems;

FIG. 34 is an end view of the panel of FIG. 33; and

FIG. 35 is a sectional view of another embodiment of the wall panel for kiln floor restoration automation in accordance with the invention.

DESCRIPTION OF THE PREFERRED EMBODIMENTS

Referring now to FIGS. 1, 2, 3 and 4, there is illustrated the kiln floor assembly of the invention, generally designated by reference numeral 1, and shown in a closed configuration to support a load of grain and the like. Upon a drying cycle being completed through the use of heating devices (not shown) within the kiln, the grain is typically dumped from the floor system downward for collection by hoppers and the like (not shown). The kiln floor system 1 extends longitudinally between two end walls 2 and 4 within the malt house as shown in FIG. 1.

A pair of bulkheads 5 are secured to the walls 2 and 4 at each end of the kiln floor system 1 and define the length of the kiln floor by the vertical walls 5' of the bulkheads. In many situations, the walls 2 and 4 are spaced apart by a distance such as 180 feet and the like, and the length of the kiln floor defined by the separation between the vertical walls 5' of the bulkheads is a few feet shorter than the distance between the end walls. The ends of the kiln floor system 1 are respectively supported on the end walls 2 and 4 by means of a pair of beams 6, which are affixed to the surface of the walls 2 and 4 in a conventional manner.

The central portion of the kiln floor system 1 is carried by a plurality of I-beams 8 extending laterally in parallel relationship to walls 2 and 4 as shown in FIGS. 1 and 3. The I-beams 8 in turn support the lower edge of a plurality of longitudinally extending stringers 10 disposed in paired relationship. Each pair of the stringers 10 are spaced in parallel relationship to each other and extend the length of the kiln floor system 1 between the end walls 2 and 4. The stringers 10 are formed in a plurality of elongated segments suitably coupled end to end as will be described. The lateral sides of the kiln floor system 1 are enclosed by a pair of embedment walls 12 and 14 as best illustrated in FIGS. 2 and 3. An aisle is conventionally provided adjacent to the outer wall of the embedment wall 14 and is formed by a concrete floor 16 which is supported by the I-beams 8. The aisle permits access by personnel to points adjacent to the kiln floor system 1. An air cylinder system 18, which effects dumping and closing of the kiln floor system 1 in a manner to be described, is affixed to the embedment wall 14 and is accessible from the aisle.

The floor structure of the kiln floor system of the invention is in the form of a tray assembly 20 upon which the grain being dried is loaded and dumped as desired after suitable processing of the material. The tray assembly 20 includes a first and second end row of trays 22 and 22a comprising a plurality of tray units affixed end to end across the lateral extent of the kiln floor as illustrated in FIGS. 2 and 8. The floor assembly further includes a plurality of rows of field trays 24 which are disposed in units in end to end relation in rows across the kiln floor. Both the end trays 22 and 22a, and the field trays 24 are mounted for pivotal movement to permit dumping of the grain supported thereon. The trays are adapted to be pivoted in a sequential manner commencing from end trays 22 and lengthwise along the extent of the kiln floor system 1 as will be apparent.

Each row of the tray assemblies 20, whether end trays 22 and 22a or field trays 24, include a plurality of tray frames 30 having a plurality of downward extending end walls 32, and a pair of downward extending side walls 34 as best shown in FIG. 10. A plurality of reinforcing plates, including a pair of spaced dump linkage plates 36 as shown in FIG. 7, and other plates not shown, are spaced along the length of the tray frame 30 and are welded to the side walls 34 of the frames. Each of the end walls 32 have aligned openings 38 to receive an elongated tray support tube 42 in affixed securement to the end walls by welding and the like. The support tube 42 also extends through aligned openings (not shown) through the frame reinforcing plates for attachment thereto. The respective tray support tubes 42 support each row of end or field trays for pivotal movement relative to the embedment walls 12 and 14. It should be noted that the support tubes 42 extend at an offset position from the longitudinal centerline of the tray frame 30 to create a torque about this axis when loaded and facilitate efficiency of the dumping operation.

As best shown in FIGS. 4, 8 and 10, a plurality of sections of tray assemblies 20 are coupled end to end to form each row of either end or field trays. A pair of bolt assemblies 44 are affixed to holes 46 of adjoining frames 30 to secure the members together in a manner illustrated in FIG. 8 depicting one of the securement means. Referring to FIGS. 10 and 11, the side walls 34 of the tray frame have respective leading edge and trailing edge flanges 50 and 52 which extend along the length of the tray frames 30 and laterally across the kiln floor. The flange 50 forms an upper surface lying along approximately the same plane as upper surface tray frame 30, while the trailing edge flange 52 is offset and spaced beneath the upper surface of the tray frame to permit effective coupling of the edges of adjoining rows of the tray assemblies. The tray frames 30 support a respective perforated, metal tray sheet 60 having opposed edge portions 62a and 62b, which are respectively bent over the leading edge flange 50 and trailing edge flange 52 in a manner shown in FIGS. 10 and 11. Such a crimped attachment of the sheets 60 to the tray frames 30 achieves a removeable, but effective coupling to define the floor created by the tray assemblies 20. Thus, the tray sheets 60 as attached to the tray assemblies 20 do not require fasteners as in the prior art and may be readily removed if replacement of the tray sheets is necessary after use of the floor system of the invention. Moreover, it should be apparent that the crimped nature of the attachment of the sheets 60 to the front and trailing ends results in a multi-layer structure to strengthen the unsupported leading and trailing edges of the tray assemblies 20 in a manner not contemplated in the prior art.

As was stated previously, each of the rows of tray assemblies 20 are pivotally mounted on the embedment walls 12 and 14 by means of respective tray pivot tubes 42. As best shown in FIGS. 3 and 9, each of the pivot tubes 42 are journaled for rotation on the embedment walls 12 and 14 in bearing openings 72a and 72b formed in embedment wall plates 74a and 74b to be described in detail later. The end walls of each tray frame 30 adjacent the bearing openings 72a and 72b are attached to an end plate 76 having a pair of studs 77 welded to an inner surface thereof. The studs 77 (one of which is shown in FIG. 9) includes a threaded end to receive a nut 77a to affix the end plate 76 to tray frames 30 with the studs extending through holes 46 (FIG. 10). It should be apparent that the tray tubes 42 are adapted to extend into bearing openings 72a and 72b for rotation thereon as illustrated. One or more spacers 78 may be positioned on studs 77 between plates 76 and the tray assemblies 20 to fill any gap caused by wall variations and the like.

The tray pivot tubes 42 are carried on stringers 10 by a plurality of saddles 80 as best shown in FIGS. 3, 12, 12a and 13. The saddles 80 are provided with a vertically extending saddle bar 81 having an upper saddle bearing 82. A pair of upper plates 83 are fixed on opposite sides of saddle bar 81 by means of a bolt assembly 83a, and an upper captivating washer 84 retains the outer ends of the plates 83. A pair of bottom clamp plates 86 and 88 are welded together at portion 89 to embrace the support bar 81 while the clamps 86 and 88 are welded to the support bar 81 at openings 90 of clamp 86. A slot 91 is formed in clamps 86 and 88 to receive a lower captivating washer coupled to bolt assembly 92. Cut-out portions 93a and 93b respectively formed in the upper and lower clamp plates create a torque tube receiving opening 94. The bottom end of the support bar 81 is suitably bolted by bolt assemblies 95 between the components of the stringers 10 as shown in FIGS. 12 and 13. It should be clear that the saddles 80 act to support the plurality of tray assemblies 20 through contact of saddle bearings 82 with tray tubes 42.

As best shown in FIGS. 3 and 4, torque tubes 100 extend through the openings 94 provided in the saddles 80 and are journaled at each end beneath the tray pivot tubes 42 in the embedment plates 74a and 74b mounted on walls 12 and 14. As shown in FIG. 3, the end of the torque tube 100 at plate 74b projects therethrough into the aisle for coupling to the motive force of the system. Rotation of the torque tubes 100 is effected by the air cylinder system 18 as will be apparent and causes the tray assemblies 20 to crack and dump the grain through pivotal movement. A tray dumping linkage 102 couples the rows of tray assemblies 20 to torque tubes 100 for operative connection as shown in FIGS. 1, 3, 6 and 7. The tray dumping linkage 102 includes a pair of upper spaced bars 104 which are affixed to plates 36 of each tray frame 30 by a bolt assembly 106. The upper ends of the bars 104 are pivotally retained on a sleeve 108 which is carried by the bolt assembly 106, such that the bars 104 are self-aligned and compensating during installation through sliding movement on sleeve 108. The bars are secured at a lower portion by a welded cross member 110 which acts as a stop for a lower torsion bar lever 112. The torsion bar lever 112 is pivotally mounted on bars 104 by a bolt assembly 114 and extends downward to a respective torque tube 100 for securement thereto by welding and the like.

Referring now in general to FIGS. 1, 2, 3, and 4, and in particular, to FIG. 5, the details of the air cylinder system 18 within the aisle adjacent the kiln floor system 1 of the invention are illustrated. The air cylinder system 18 includes a plurality of air cylinder assemblies coupled to the torque tubes 100 to effect rotation of each row of tray assemblies in a sequential manner, such that the load of grain supported on the floor is caused to be dropped through the floor into receiving hoppers and the like. The row of end trays 22, which is initially cracked during dumping, is coupled to its own air cylinder assembly 120, and the second row of end trays 22a immediately adjacent thereto is also activated by a single cylinder assembly 120a. The remaining air cylinder assemblies 122 are operatively coupled to a pair of rows of field trays 24 to enable a single air cylinder to rotate two rows of field trays on a sequential basis. It is also within the scope of the invention to couple each air cylinder assembly 122 to more than two rows of trays dependent on desired results and encountered conditions.

As best shown in FIGS. 3 and 5, the air cylinder assembly 120, which is coupled to the end trays 22, is pivotally mounted on a mounting bracket 124 and has an extensible end 126. The extensible end 126 is directly coupled to the end tray torque tube 100 by means of a lever 128 suitably affixed thereto. As is apparent in FIG. 1, a portion of the upper surface of the end trays 22 is situated within the bulkheads 5, as are the tray members 22b at the opposite end of the kiln floor, to insure that the grain is retained without leakage. Thus, as is clear in FIG. 1, the end tray row 22 is mounted on tray tube 42 along an off-center axis for pivotal movement in a counter-clockwise direction, while the end trays 22b move in a clockwise rotation in a manner similar to each of the rows of field trays 24 disposed therebetween. The second row of end trays 22a immediately adjacent to end trays 22 is also coupled to a single air cylinder 120a, and a direct linkage 130 is coupled to the torque bar 100 of the second row of trays. As shown in FIG. 5, the extensible end 126 of the air cylinder assembly 120 maintains the end row 22 of trays in a closed configuration in its extended configuration. Thus, as the air cylinder assembly is retracted, the end trays 22 will pivot in a counter-clockwise direction to commence a dumping operation as will be apparent. It should also be noted that the extensible ends 126a and 132 of air cylinder assemblies 120a and 122, respectively, are all in a retracted position when maintaining their associated row(s) of tray assemblies in a closed mode as shown in FIG. 4.

Each of the air cylinder assemblies 122 of the field trays 24 beginning at the third row are coupled by a novel drive linkage to a pair of torque tubes 100 for two separate rows of field trays. The air cylinder assembly 122 is pivotally mounted on a mounting bracket 140, and its extensible end 132 is coupled by means of a link 142 to a drive linkage bar 144. The drive linkage bar 144 is pivotally connected at each end to respective pivot arms 146a and 146b attached thereto by means of a bolt assembly 148. During the extension of each of the air cylinder assemblies 122 to effect rotation of a pair of rows of field trays, the first row is directly opened through pivotal movement of arm 146a upon initial extension of the air cylinder, while a dwell mechanism is provided in the connection with the second pivot arm 146b to delay opening of the second adjacent row until the first tray row coupled to the common air cylinder 122 has cracked to initiate dumping. The delay is accomplished by the provision of an elongated slot 150 within the drive linkage bar 144, such that the bolt assembly connecting the pivot arm 146b to the drive linkage bar 144 moves from one end of the slot 150 until its engagement with the other end of the slot. After contact, the pivot arm 146b is caused to turn and rotate its coupled torque tube 100 and consequently, its row of the field trays 24. The extent of the delay in cracking each of the second rows is dependent on the length of the slot 150. It should also be apparent that a common air cylinder assembly may be linked with more than two rows of field trays, and a series of slots 150 of varying length could be employed to effect sequential operation under such circumstances.

As stated previously, grain piles upon the kiln floor system 1 of the invention to a depth of as much as two or three feet high and is dispersed at approximately 80 to 120 pounds per square feet. Since the tray tubes 42 support the trays at an offset position from the leading edge thereof, there is normally a preponderance of weight on the dropping side of the trays when fully loaded. This offset of the pivotal axis is also present in end trays 22, but the dropping side of the first row is opposite to the field trays, as is clear from FIGS. 1 and 3. However, because of the dispersion of malt, the tray assemblies 20 will not dump unless a tipping force is applied. The linkage system of the invention coupling the air cylinder system 18 to the trays provides a very efficient use of force application as compared to the techniques of the prior art. The end trays 22 are arranged with a full load on the dumping side of the tray bearing and the malt against the bulkhead for very free flow when the leading edge of the first end row is dumped. In operation, the first rows of end trays 22 and 22a are dumped sequentially followed by successive operation of each row of field trays 24 commencing with actuation of rows 3 and 4. Each air cylinder 122 is then subsequently actuated down the line until such time as all the rows, including the last end row 22b, are rotated. The pneumatic circuit controlling operation of the individual air cylinder assemblies 120, 120a and 122 will be described in detail later.

The provision of the delay in the link 144 for each pair of rows of field trays 24 accomplishes several improvements over the prior art, including the advantage that the full force available cracks the leading row of each pair of coupled trays and initiates dumping of the malt in an efficient flow pattern. Such an arrangement further contributes to a more uniform flow in combination with the immediately preceding tray to create optimum dumping. In addition, the major force is then, because of the dwell provided by slot 150, available to dump the subsequent tray in each pair. This pattern is then consistently followed in a very orderly and controlled pattern for all remaining trays down the line.

Referring now to FIGS. 19 through 24, details of the embedment wall plates 74a and 74b are illustrated. The embedment wall plates 74a and 74b have been previously described as providing bearing journals for the tray tubes 42 and torque tubes 100. As shown in FIGS. 19, 20 and 21, the embedment wall plate 74a is used in connection with the embedment wall 12. A plurality of plates 74a extend endwise along the length of the kiln floor system 1 in attachment to the inner surface of the embedment wall 12. The embedment wall plates 74a not only strengthen the coupling of the support tubes of the kiln floor system to the wall, but simplifies the installation of the wall system by providing self-contained bearing points for the tray pivot tubes 42 and the torque tubes 100. Each of the embedment wall plates 74a includes a series of horizontally aligned upper tubes 160 defining bearing openings 72a to mount each tray pivot tube 42 for rotation. The lower array of aligned tubes 162 receive the end portions of the torque tubes 100 of each respective row of trays for bearing support. A series of perpendicularly oriented, reinforcing plates 164 extend from the inner surface of the embedment wall 74a to receive attachment means (not shown) for securing the plate 74a to the embedment wall 12 in the manner to carry the applied load.

Referring now to FIGS. 22, 23 and 24, there is illustrated the embedment wall plate 74b utilized in conjunction with the embedment wall 14, through which the torque tubes 100 extend for linkage with the air cylinder system 18 mounted within the aisle. The embedment plate 74b comprises a pair of parallel plates 170 and 170a which are spaced apart by a distance slightly less than the width of the embedment wall 14, such that the surfaces of plates 170 and 170a coincide respectively to the inner and outer surfaces of the wall. A plurality of aligned horizontal upper holes 172 and lower holes 174, corresponding respectively to the positions of the tray tubes 42 and the torque tubes 100, are present in the inner plate 170, while a series of corresponding holes are provided through plate 170a for the lower array of holes 174. The lower torque tube holes 174 are interconnected by tubular members 176 (FIG. 24) creating a bearing for the torque tubes 100 extending therethrough. Tubular members 178 are also inserted in alignment with upper holes 172, but are closed at one end due to the lack of upper holes in plate 170a. As best shown in FIGS. 22 and 23, the embedment wall plate 74b is also provided with a plurality of reinforced mounting plates 179 to permit its suitable securement to the embedment wall 14.

Referring now to FIG. 25, the fluid circuit 180 controlling the air cylinder system 18 is shown. The fluid circuit is operatively connected to air cylinders 120, 120a and 122 as shown in FIG. 25. A close pipe or manifold 182 is in direct fluid contact with air cylinder 120a through fluid line 184, and each of the air cylinders 122 through fluid line 186. An open supply pipe or manifold 187 is coupled through lines 188 to each of air cylinders 122. Pneumatic pressure is supplied through pipe 190 to the air control circuit 180 by an air compressor (not shown) or other suitable source of pneumatic pressure to regulate the supply of pneumatic pressure to the air cylinder as required. A fluid line 196 couples air cylinder 120 to a two position, four-way air valve 200. Pneumatic pressure from the pipe 190 is supplied to valve 200 through a fluid line 202. Suitable pressure regulators 204 are coupled to fluid line 202 for proper operation of the system. An air flow control valve 206 is situated in fluid line 196 to control flow to cylinder 120. A second fluid line 210 is coupled to valve 200 and in parallel to air cylinders 120 and 120a, and has a second air flow control valve 212. The pressure to the open and close manifolds 182 and 187 is controlled by a two position, four-way air valve 220 having a pair of air flow control valves 222 and 226 associated respectively with each manifold 182 and 187.

Operation of the pneumatic circuit 180 of FIG. 25 is controlled by a two position four-way manual control valve 230 having an inlet in communication with the main plant air and an outlet coupled to the inlets of both valves 200 and 220. The manually operated valve 230 is provided with a suitable lever and the like, which, when actuated, causes the two four-way air valves 200 and 220 to shift open. Thus, the kiln trays will begin dumping as soon as the pressure within the air manifold overcomes the load and resistance of the trays to a dumping sequence. The flow control valve 212 is set to cause the first two rows of end trays 22 and 22a to dump first in a sequential manner. Subsequently, the flow control valve 222 of the four-way air valve 220 is set to dump each row of field trays 24 on a sequential basis down the line after the two end rows of trays 22 and 22a have dumped. As described previously, actuation of a single air cylinder 122 controls the operation of two rows of field trays, because of the novel delay feature of the invention. After the dumping cycle is completed, the four-way valves 200 and 220 are then shifted to a closed position while setting flow control valve 206 to close row 1 first and control valve 226 to close the remaining trays.

Referring now to FIGS. 14 to 18, there is illustrated the improved I-beam and stringer system of the invention for supporting the kiln floor system 1, and for providing accurate installation thereof and optimum operation. As shown in FIGS. 14 to 18, the elongated stringers 10, extending the length of the kiln floor, are in the form of a plurality of spaced bar members 260 secured together in an end to end relationship by opposed outside connector plates 262 located at each I-beam 8. An inside connecting plate 264 is situated between each pair of stringer members 260, and the plates 262 and 264 are bolted on the stringer members 260 by means of bolt assemblies 266. As shown in FIGS. 14 and 15, the respective ends of the stringer bars 260 are separated by a space 268 to allow for thermal expansion and contraction between adjacent stringer ends and maintain alignment. Opposed pairs of stringer retaining plates 270 are welded to the lower portion of the stringer bar members 260 at the I-beam 8 located at the approximate centerline 272 (FIG. 17) of the kiln building across each of the stringer members. The edges 270a of the retainer plates extend downward in confronting, spaced relationship to the I-beams and maintain alignment of the stringers during expansion and contraction thereof. In the installation of the stringer members 260 prior to final assembly of the connecting plates 262 and 264, a stringer gauge 290 is used at each abutting joint of the stringer members 260 at an I-beam 8. The stringer gauge 290 is used in conjunction with predrilled holes 292 provided in the adjoining pair of stringer members 260. A pair of pins 294 are affixed to the stringer gauge 290 at a predetermined distance from each other, such that when the pins 294 are inserted into holes 292, the stringer members 260 are automatically positioned at a correct position at each joint and the bolts 266 may be tightened. It should be noted that stringer gauge 290 includes oversized holes 296 having a diameter larger than the bolts 266 to permit tightening thereof and removal of the gauge 290 for use at another joint of stringer 260 being installed. After removal of the stringer gauge, the stringer holes 292 may be used to receive bolt assembly 95 affixing a saddle assembly 80 in place (FIGS. 12 and 13).

The stringers 10 are the foundation of the kiln floor system and must be accurately set with alignment of the saddles 80 matching bearing holes in the wall embedments. The proper positioning of the stringers during installation is further made possible in accordance with the present invention by the use of stringer locating brace assemblies 300 as shown in FIGS. 16, 17 and 18. The stringer locating brace assemblies 300 insure that each segment of the stringers 10 forming the length thereof are accurately aligned with each other across the entire width of the floor system. The stringer locating brace assemblies 300 are positioned at each mid I-beam location along the length of the floor and extend across a plurality of stringer rows to insure such proper installation. The brace assemblies 300 include a plurality of plates 302 which are welded to the underside of elongated angle member 304 extending across the stringers 260. Holes 306 are provided in plates 302 and are spaced from each other by the desired spacing of the stringers 260 for accurate placement. A bolt assembly 308 is inserted through each hole 306 and downward between the pairs of stringer members 260 for securement to a captivating washer 310. The stringer locating brace 300 also has the advantage of maintaining the stringers 260 upright in proper orientation during installation procedures.

Referring now to FIGS. 1 and 3, there is illustrated a wear bar and gear rack system 310 which extends along the entire extent of wall embedments 12 and 14 at an upper position thereof to support the wheels of a turning machine (not shown). Conventionally, a turning machine extends the entire width of the kiln and has flanged wheels that operate on the two wear bars 312 which are attached to each wall 12 and 14. In addition, a pair of gear racks 314 further extend the length of the kiln in association with the wear bars 312 and mesh with pinions of the turning machine, such as pinion 316 of FIG. 26. The pinions are driven by a common shaft (not shown) to propel the turning machine along the kiln floor. The turning machine is typically used in conjunction with augers which extend downward into the grain to cause the material to be stirred while being dried.

As best shown in FIGS. 26 and 27 directed to a first embodiment of the improved adjustable mounting of the gear rack in accordance with the invention, the wear bar 312 is in the form of an elongated bar coupled to the upper corners of the embedment wall 12 and 14 (FIG. 3). The wear bar 312 is welded to the top surface of an elongated L-shaped support member 320 which is anchored to embedment wall 12 by a suitable technique. A similar mounting of the other wear bar 312 to wall 14 is employed, as is the mounting of gear rack 314 to wall 14 as will be described. The gear rack 314 is disposed in spaced relation to the wear bar 312 and is supported by a plurality of bolt assemblies 322 extending into wall 12 coupling with a threaded female member 324 rigidly attached to support member 320. The gear rack 314 on each wall 12 and 14 is formed in a plurality of independently adjustable sections lying end to end adjacent the wear bar 312. Each rack section includes a base portion 330 and an upper tooth portion 332 having a thickness greater than the base portion 330 to form a lower surface 334. Each of the sections of gear rack 314 are coupled to the walls by two or more of the bolt assemblies 322 at a respective slot 336 provided in base portion 330 as shown in FIGS. 26 and 27.

Each of the gear rack sections of the invention, are independently adjustable so that realignment of the sections of gear rack can be attained, if necessary, at the time of installation of the gear rack, or at a later time where misalignment with respect to the pinion occurs along the gear rack due to wear. The adjustability of each section with respect to an adjoining section, is accomplished by means of a cam member 340, which is carried by the bolt assembly 322 and having a camming surface 342 in contact with lower surface 334 of the gear rack. As is apparent in FIGS. 26 and 27, each of the bolt assemblies 322 of a respective gear rack section may be loosened, and the cam 340 rotated to lower or raise the gear rack section as desired. By tightening the bolt assembly 322, it should be apparent that the cam 340 and its associated structure are locked into position.

Referring now to FIG. 28, there is illustrated still another embodiment of the adjustment means to adjust the vertical position of a section of the gear rack 314 in a manner similar to the preceding embodiment of FIGS. 26 and 27. The embodiment of FIG. 28 employs a cam 340a which is similar to the cam of FIG. 27, except that the cam surface 342a is formed with a plurality of flats 350 to maintain the cam in more positive contact with the gear rack in selected adjusted positions.

Referring now to FIG. 29, there is illustrated another embodiment of the gear rack adjustment means of the invention. The circular cam of the preceding embodiment is replaced by a cam plate 360 having an elongated slot 362 disposed in a sloped orientation. Movement of the plate 360 relative to each of the bolt assemblies 322 of a gear rack section will accordingly effect vertical movement of the upper edge 364 of the plate and adjust the vertical position gear rack. A series of rounded sections 366 are provided in the upper edge of the slot 362 to permit the plate to engage the shaft of the bolt assembly 322 at a particular position for better retention.

Referring now to FIGS. 30 and 31, there is illustrated still another embodiment of the gear rack adjustment means of the invention. The gear rack adjustment means of FIGS. 30 and 31 is intended to permit adjustment of each section of gear rack 314 in a manner similar as disclosed in connection with the preceding embodiments and may also be coupled to a respective gear section at a plurality of locations. The cam or cam plate of the preceding embodiments is replaced in the embodiment of FIGS. 30 and 31 with a captivating washer-like member 370. The member 370 is retained on the underside of the base portion 330 of the gear rack section by the shaft of the bolt assembly 322. A sloped slot 372 is provided in the front surface 374 of the member 370 to receive the bolt assembly 322 for attachment to the embedment wall 12. In FIGS. 30 and 31, it should be noted that the open slot in base portion 330, as previously described, is replaced by a closed oblong hole 376. Movement of the member 370, while the bolt is loosened with respect to the gear rack base, causes the gear rack to move in either an upward or downward direction dependent on the relative position of the bolt within the slot 372. A plurality of circular cut-outs 380 are provided in the upper edge of slot 372 to insure efficient coupling of the bolt within the slot. It is within the scope of the invention, however, to provide a smooth upper surface in the slotted member, such as shown in FIG. 32, if such described positioning is not needed in use of the system.

In the preceding embodiments of FIGS. 26 to 32, several embodiments have been disclosed by which the gear rack 314 may be adjusted either downward or upward relative to the embedment wall to permit alignment for installation, and convenient adjustment for compensation for wear and other considerations during use of the kiln. The adjustability of the invention of the gear rack prevents the pinions of the turning machine from becoming askew, until such time as the machine jumps off the track against the kiln floor as does occur in the prior art. Such dropping of the turning machine not only causes damage, but effects expensive down time of the kiln floor system.

Referring now to FIGS. 33 to 35, there is illustrated additional embodiments of applicant's invention for use with kiln floors. In the foregoing disclosure, there has been disclosed an improved kiln floor system and improvements thereof directed to an automated system having pneumatic cylinders mounted within the aisle where manual operators typically rotate the trays. Old kiln floors have kiln walls of various configurations which may not lend to efficient modification or adaption of an aisle dump system. A practical method to automate an old manual floor is to provide wall plate assemblies such as shown in FIGS. 33, 34 and 35. These wall plates can be securely fastened to the old walls and thereby provide bearings for trays and torque tubes. The floor support system will be identical to that provided in the aisle dump system previously described. However, the air cylinders and dump bar linkage is attached to the center stringer. The advantages of the aisle dump system previously described can hereby be efficiently adapted to old kilns.

In FIGS. 33, 34 and 35, there is illustrated an improved wall panel assembly which permits an existing kiln to be adapted to receive the torque tubes and tray tubes of a center operated dump system. In FIGS. 33 and 35, a first embodiment of the wall panel of the invention is shown. The wall panel assembly includes a plurality of flat panel members 400 affixed to an upper welded brace 402. A lower brace 404 is also welded to each of the panels 400. The panels 400 are adapted to be attached as a plurality of separate components which are aligned and affixed to an abutting relationship on the existing kiln wall 406 (FIG. 35). Plug welds 408 and the like are used to couple the panels for forming a unitary support structure. Tray and torque tube receiving openings 410 and 412 are provided in each of the panels in an orientation, such as is present in the previously described embodiment for embedment wall plates 74a and 74b. Tubular member 414 is welded to the back of the panels in alignment with each of openings 408 and 410. The rear end of the tubular members 414 is provided with an end plate 416 which receives a bolt assembly 418 suitably anchored to the wall 406 of the kiln. It should be apparent that a plurality of the panels 400 are installed along the length of the kiln floor being installed, and each of the tray and torque tubes operating from a center dump system may be supported in bearing points provided by tubular members 414. It is also within the scope of the invention to use one of the panels 400 as a support structure of at least one wall of an aisle operated kiln floor or, as support panels for use as a component in the construction of new kiln houses.

In FIG. 34, there is illustrated a specific embodiment of the improved wall panel of the invention which may be installed as a panel during contruction of new kilns. The top of each panel 400a is directly welded to a suitable bracket 420 suitably attached and anchored to the wall 406a. The bottom portion of the panel 400a may also be appropriately welded or otherwise attached to the wall 406a as is required. The panel 400a is also formed with upper and lower tube receiving openings 410a and 412a and closed ended bearing tubes 422 to receive the tray or torque tubes.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A dump linkage for use in a kiln floor system comprising
a tray assembly pivotally mounted about a horizontal axis for dumping a load of material and having a pair of downwardly projecting plates,
a pair of upper spaced bars having spaced upper end portions located intermediate said plates, means connecting said upper end portions to said plates of said tray assembly for pivotal movement of said upper end portion relative to said plates about a pivot axis, said connecting means further permitting axial movement of said upper end portion relative to said plates along said pivot axis for self-compensation of any misalignment arising during movement,
a lower bar rigidly coupled to the torque transmitting shaft of a force applying device,
shaft means disposed between said upper bars, mounting said lower bar for pivotal movement on said upper pair of bars,
a portion of said lower bar extending between upper bars, and
stop means affixed between said upper bars to limit pivotal movement of said lower bar relative to said upper bars about said shaft means.

* * * * *